United States Patent [19]
Visioli et al.

[11] Patent Number: 5,350,788
[45] Date of Patent: * Sep. 27, 1994

[54] METHOD FOR REDUCING ODORS IN RECYCLED PLASTICS AND COMPOSITIONS RELATING THERETO

[75] Inventors: Donna L. Visioli, Lower Gwynedd, Pa.; Vincent Brodie, III, Wilmington, Del.

[73] Assignee: E. I. Du Pont de Nemours and Company, Wilmington, Del.

[*] Notice: The portion of the term of this patent subsequent to Feb. 8, 2011 has been disclaimed.

[21] Appl. No.: 29,747

[22] Filed: Mar. 11, 1993

[51] Int. Cl.$^5$ .............................................. C08R 5/17
[52] U.S. Cl. ................................... 524/251; 524/252; 524/237; 528/492
[58] Field of Search ....................... 524/237, 252, 251; 528/492

[56] References Cited

U.S. PATENT DOCUMENTS

| | | | |
|---|---|---|---|
| 3,033,707 | 5/1962 | Lacy et al. | 428/215 |
| 3,140,196 | 7/1964 | Lacy et al. | 428/457 |
| 3,230,135 | 1/1966 | Hurst | 428/421 |
| 4,146,590 | 3/1979 | Yamamoto et al. | 525/168 |
| 4,547,350 | 10/1985 | Gesser | 524/612 |
| 4,818,598 | 4/1989 | Wong | 524/52 |
| 4,892,719 | 1/1990 | Gesser | 423/245.1 |

FOREIGN PATENT DOCUMENTS 374861 6/1990 European Pat. Off. .

OTHER PUBLICATIONS

Gesser, H. D., "The Reduction of Indoor Formaldehyde Gas and that Emanating from Urea Formaldehyde Foam Insulation (UFFI)" *Environment International*, vol. 10, pp. 305–308, 1984.
Gesser, H. D., et al., "Removal of Aldehydes and Acidic Pollutants from Indoor Air" *ES&T Research*.
"MICA A-131-X Water Borne Extrusion primer and Laminating Adhesive" Product Information.
DeRoo, A. M., "Polyethylenimide in Adhesives", Chapter 36, pp. 592–596.
Miltz, J., et al., "The Effect of Polyethylene Contact Surface on the Shelf Life of Food Products", pp. 245–257.
Potts, M. W., et al. "Relative Taste Performance of Plastics in Food Packaging", *Journal of Plastic & Sheeting*, vol. 6, Jan. 1990, pp. 31–43.
Kim-Kang, H., "Volatiles in Packaging Materials", *Food Science and Nutrition*, 1990, pp. 255–271.
Landios-Garza, J. et al., "Plastic Packaging Can Cause Aroma Sorption", Food Engineering, Apr. 1987, pp. 39 & 42.
Tavss, E. A., et al., "Analysis of Flavor Absorption into Plastic Packaging Materials Using Multiple Headspace Extraction Gas Chromatography", *Journal of Chromatography*, 438 (1988) 281–289.
Salame, M., "Retaining Flavor in Plastics-Packaged Products", *Plastics Packaging*, 1988.
Aminabhavi, T. M., "An Overview of the Theoretical Models Used to Predict Transport of Small Molecules Through Polymer Membranes", *JMS—Rev. Macromol. Chem. Phys.*, C28(3&4), 421–474 (1988).
Kail, J. A. E., "Flavor Barrier Evaluation Enhances Material Selection", *Packaging*, Sep. 1984, pp. 68–70.
Polyethyleneimine/Polypropylene Composition for a Packaging Structure Patent Application Ser. No. 07/974,042 filed Nov. 10, 1992.
Novel Packaging Compositions That Extend Shelf Life of Oil Containing Foods Patent Application Ser. No. 07/724,421, filed Jul. 3, 1991.

Primary Examiner—Paul R. Michl
Assistant Examiner—Olga Asinovsky
Attorney, Agent, or Firm—Konrad S. Kaeding

[57] ABSTRACT

The present invention relates generally to recycled plastics which exhibit noxious odors. More specifically, the present invention is directed to a method of reducing unwanted odors in such recycled plastics by incorporating a polyalkylene imine ("PAI"), more preferably polyethylene imine ("PEI").

8 Claims, No Drawings

METHOD FOR REDUCING ODORS IN RECYCLED PLASTICS AND COMPOSITIONS RELATING THERETO

FIELD OF THE INVENTION

The present invention relates generally to recycled plastics which exhibit noxious odors. More specifically, the present invention is directed to a method of reducing unwanted odors in such recycled plastics by incorporating a polyalkylene imine ("PAI"), more preferably polyethylene imine ("PEI").

BACKGROUND OF THE INVENTION

Polyalkylene Imine ("PAI")

A co-inventor of the present invention is also a co-inventor to "Novel Packaging Compositions That Extend The Shelf Life Of Oil-Containing Foods", U.S. Ser. No. 07/724,421, filed Jul. 3, 1991, in which PEI is disclosed to have aldehyde scavenging capabilities (which can extend shelf life of oil-containing foods) when used as part of a packaging material.

The present inventors are also the inventors of U.S. Ser. No. 07/974,042, filed Nov. 10, 1992, which is directed to specific compositions comprising a blend of olefinic polymer and PAI. The compositions are taught to be particularly useful in packaging applications, since they are capable of extending the shelf life of oil-containing foods.

Recycled Plastics

Approximately 3 billion pounds of high density polyethylene ("HDPE") is presently being used in blow molding applications. Unfortunately, attempts to recycle HDPE (and to use in end-use products) have been hampered by unwanted odor problems. Generally speaking, volatiles from the packaged liquid, chemical or other product will oftentimes be absorbed into the HDPE, and unfortunately, the penetration generally cannot be easily reversed. Interestingly, the absorbent oftentimes does not unduly effect the critical polymer properties. Hence, the problem is not so much to get the absorbant out of the HDPE, but rather, merely to eliminate the odor problems.

Odor problems occur with many recycled plastics in addition to HDPE and such odor problems are often no small matter, ranging from evacuations of reclamation facilities to the loss of sales due to odor problems of molded parts (i.e., clothes hangers or storage cabinets containing recycled plastic can impart unwanted odors which permeate the nearby goods). Odor problems have been addressed (with varying degrees of success) by improved management of bottle collection and storage and also by changes in the reclaim line operating conditions. However, a need exists to resolve these odor problems in a simpler, more reliable and more cost efficient manner, if society is to meet its ambitious goals of economical plastics recycling.

SUMMARY OF THE INVENTION

The present invention is directed to novel compositions of polyalkylene imine ("PAI"), more preferably polyethylene imine ("PEI"), and recycled polymer. Preferred recycled polymers include high density polyethylene ("HDPE"), particularly recycled HDPE containers originally used in the household or industrial chemical market.

It has been surprisingly discovered that the compositions of the present invention are far less odorous than similar compositions which are devoid of PAI. In an alternative embodiment, "binding agents" are added to the compositions to more securely bind the PAI into the polymer matrix.

The present invention is also directed to a process for preparing a blend of recycled polymer and PAI comprising the following steps:

(i) adding the PAI and recycled polymer in a weight ratio of about 0,001-50:100-100,000, more preferably 0.001-30:100 to a compounding extruder, Banbury mixer or similar type heat mixing machine or the like;

(ii) blending the mixture at a temperature appropriate for the particular recycled material selected, thereby forming a polymer blend; and (iii) pelletizing, molding, extruding and/or thermoforming the resulting heated blend.

The present invention also relates to a process for preparing films, molded articles or thermoformed articles by a compounding or masterbatch process. The method of producing the blend is not material as long as a relatively uniform distribution of the PAI polymer through the recycled polymer is obtained. It is preferred for the blend to have intimate mixing of the polymers, i.e. microscopical distribution of PAI through the recycled polymer, whereby the size of the dispersed phase is no more than 100 microns, preferably about 10 microns or less.

The final composition has been found to be extremely stable and to have far less odor than compositions not containing PAI. Migration or surface blooming of the PAI within the recycled polymer material has been surprisingly found to not be a problem in the practice of the present invention. After incorporating the PAI into the recycle polymer material, the resulting material can be incorporated into other polymeric materials or incorporated into a layer of a conventional multilayer structure.

DETAILED DESCRIPTION OF THE PREFERRED EMBODIMENT

Introduction

The present invention is directed to novel compositions comprising recycled polymer, most preferably high density polyethylene ("HDPE") and polyalkylene imine ("PAI"), most preferably polyethylene imine ("PEI"). It has been surprisingly discovered that such compositions are far less odorous than compositions comprising recycled polymer alone. In the alternative embodiment, "binding agents" are added to the compositions of the present invention which even more securely bind the PEI into the polymer matrix.

Each component (and optional additives) of the present invention will be discussed separately, followed by a discussion involving the combining of these components and their use.

Recycled Polymer

As used herein, recycled polymer is intended to include any scrap polymeric material, including polymers (such as homopolymers, copolymers, terpolymers and the like, including any additives, fillers or the like incorporated therein), oligomers and derivatives thereof. Broadly speaking, recycled polymers comprise thermoplastic materials which were once heat processed into an article, film or the like but which now are considered scrap.

In the most preferred embodiment, the scrap polymeric material is sorted according to composition and color. Optionally, the scrap polymeric material can be washed, such as with hot water containing a surfactant. Preferably, the recycle material is ground into pellets, flakes, fine particles or the like.

Preferred recycle materials include polyesters, such as polyethylene terephthalate, and polyolefin homopolymers and copolymers. Preferred olefinic polymers include olefic homopolymers, such as polypropylene, high density polyethylene ("HDPE"), low density polyethylene ("LDPE"), linear low density polyethylene ("LLDPE"), ultra-low density polyethylene ("ULDPE") and the like.

"Olefinic polymer" as used herein is intended to also include copolymers and derivatives thereof. Such copolymers (or derivatives thereof) include polymers derived from a combination of olefinic monomer and vinyl ester monomer (or acid derivatives of the vinyl ester monomer). The preferred vinyl ester monomers (or acids thereof) are those having one to seven carbon atoms, such as acetates, acrylates, methacrylates, (meth-)acrylic acids (which can be partially or wholly neutralized with ions, such as zinc or sodium) and the like.

Polyalkylene Imines ("PAI")

The preferred polyalkylene imines of the present invention can be defined according to the following structure:

in which n and m are the same or different and have a numerical value of at least 1. A high percentage of nitrogen is preferred, and therefore preferably, n is 1 to 4, more preferably 1 (polyethylene imine or "PEI"), and m is preferably a value of greater than about 25, more preferably greater than about 250 and most preferably greater than about 2500. It is generally advantageous to avoid use of very low molecular weight materials having excessive amounts of materials which can migrate or volatilize. The most preferred molecular weigh (determined by light scattering) is preferably above about 800 and more preferably above about 1500 and most preferably above about 2500.

PEI can be synthesized from aziridine (or ethyleneimine) generally through sulfonic acid esterification of ethanolamine; the monomer is then reacted in an acid-catalyzed ring-opening homopolymerization to form the PEI molecule. In the most preferred embodiment, the PEI is not heavily branched and preferably has a relatively low percentage of tertiary amines.

Optional Additives

"Binding Agents" can be added to the compositions of the present invention to further "lock in" the PAI to the polymer matrix. Useful binding agents are functionalized polymers which will react with polyalkylene imine. Preferred binding agents are polymers functionalized with carboxyl functionality, most particularly anhydride functionality.

Other optional additives include antioxidants, lubricants, dispersants (or surfactants) in an amount of about 5 percent by weight or less. Conventionally known additives relating to film manufacturing or processing can optionally be used as part of the present invention.

Combining the Recycled Polymer With the PAI

The present invention is also directed to a process for preparing a blend of recycled polymer and PAI comprising the following steps:

(i) adding the PAI and recycled polymer in a weight ratio of about 0,001-50:100-100,000, more preferably 0,001-30:100 to a compounding extruder, Banbury mixer or similar type heat mixing machine or the like;

(ii) blending the mixture at temperatures between about 50° C. and about 500° C., more preferably 85° C.-300° C. and most preferably 100° C.-250° C., depending upon the type of recycle resin chosen, thereby forming a polymer blend; and (iii) pelletizing, molding, extruding and/or thermoforming the resulting heated blend.

The present invention also relates to a process for preparing films, molded or thermoformed articles by a compounding or masterbatch process.

The method of producing the blend is not material as long as a relatively uniform distribution of the PAI polymer through the recycled polymer is obtained. It is preferred for the blend to have intimate mixing of the polymers, i.e. microscopical distribution of PAI through the recycled polymer, whereby the size of the dispersed phase is no more than 100 microns, preferably about 10 microns or less.

In one modification, the blend components are extruded, and the blend is obtained as the extrudate. In an alternate modification, the components are blended in other mixing devices which exhibit high shear, such as a Banbury or similar-type mixer.

The blend of PAI and olefinic polymer can be prepared by the following process:

the PAI is metered into a recycle polymer influent stream into an extruder-type apparatus;

the combination of material is then moved into a feeder attached to a 15 mm co-rotating twin screw extruder (or the like), such as one made by Baker Perkins (a 30 mm twin screw extruder may also be used, such as a Werner and Pfleiderer extruder, and even larger equipment is contemplated as useful herein).

The feed rate can be set at different rates without affecting the resultant product. The mixture can be starve fed (less than the capacity of the screw) or flood fed (more than the capacity of the screw). The extruder can be run at a variety of speeds, such as 300 rpm for a 15 mm extruder. The resulting extruded strand is preferably quenched (such as in water or the like) at room temperature, then fed into a chopper to form pellets.

Pellets can then be used to make films, molded articles, thermoforms lo or the like using conventional equipment. The extruder can be run at any appropriate temperature, depending upon the type of recycled plastic used. A preferred temperature range can be 100° C. to 225° C. The processing conditions will have to be regulated such as by limiting residence of time of the contents of the mixing device in order to limit possible polymer degradation and achieve desired intimate mixing of the polymer.

An alternative method for preparing a blend involves a masterbatch process, whereby the recycled polymer and the PAI are mixed together in high shear mixing equipment, such as a Banbury mixer extruder or the like.

Whether the final mixture is made by extrusion or high shear mixing, the resulting material can then be used as a concentrate and fed into another polymer stream (either the same or different from the recycled polymer initially mixed with the PAI to form the concentrate) and extruded as described above or mixed in a high shear mixer (as also described above) and ultimately extruded, molded or formed as desired, according to conventional such processing techniques.

The Final Composition

The final composition has been found to be extremely stable and to have far less odor than compositions not containing PAI. Migration or surface blooming of the liquid PAI within the recycled polymer material has been surprisingly found to not be a problem in the practice of the present invention. By incorporating the PAI into the recycle polymer material, the PAI can be incorporated into a molded or formed article or into an existing layer of a conventional multilayer structure (or can be blended or extruded as a monolayer material).

Alternatively, since recycled material often have diminished properties relative to virgin material, the recycle is incorporated into a middle layer of a composite structure, whereby the outer layers comprise virgin material. The present invention is well suited for such packaging structures.

Prior to the present invention, it appears that the prevailing teaching in the art was that the odor from recycled plastics arises from development of butyric acid or similar-type compositions generally associated with rancidity or noxious odors. However, standard grade recycled milk jug flake was analyzed using headspace gas chromatography-mass spectroscopy equipment (headspace GC-MS) using a helium purge and a temperature of 125° C., and the results showed acetaldehyde, and trace amounts of propanal, butanal, petnanal and heptanal; the analysis also detected low boiling hydrocarbons (butene, pentane, heptane, octerie, octane, decane, tridecane), ethanol and acetic acid.

It was quite surprising therefore to determine that the noxious odors could be substantially removed through the use of an aldehyde scavenging material. It was quite surprising that the PAI was able to so significantly diminish the odor otherwise inherent with such recycled polymer materials.

A odor test was conducted, comparing: 1. a packaging film structure containing recycled HDPE and about. 1 weight percent PEI; and 2. the packaging film structure of "1." minus the PEI. A panel skilled in odor detection found the odor to be significantly less for the PEI containing compositions.

What is claimed is:

1. A method for reducing aldehyde odor of a recycled polymeric material, said method comprising the step of incorporating into the recycled polymeric material a polyalkylene imine.

2. A composition comprising a blend of a recycled polymeric material comprising an aldehyde and polyalkylene imine.

3. The composition of claim 2, wherein the weight ratio of polyalkylene imine to recycled polymer is in the range of about 0.001–30;100–100,000.

4. The composition of claim 3 wherein the weight ratio of polyalkylene imine to recycled polymer is in the range of about 0.001–30;100.

5. The composition of claim 4 wherein the polyalkylene imine in polyethylene imine having a molecular weight (determined by light scattering) of greater than about 500.

6. A process of combining polyalkylene imine ("PAI") with a recycled polymer material, said process comprising the steps of:
   mixing the components at a temperature sufficient to cause the PAI to form a dispersed phase defining microscopic particles of less than 10 microns.

7. The process of claim 4 wherein the PAI particle size is less than 2 microns and the recycled polymer comprises high density polyethylene.

8. The process of claim 7, further comprising:
   blending the mixture resulting from the process of claim 5 with a second polymeric material.

* * * * *